United States Patent [19]

Bernard

[11] 4,292,148

[45] Sep. 29, 1981

[54] POST-TREATMENT OF ETCHED ALUMINUM CAPACITOR FOIL

[75] Inventor: Walter J. Bernard, Williamstown, Mass.

[73] Assignee: Sprague Electric Company, North Adams, Mass.

[21] Appl. No.: 175,986

[22] Filed: Aug. 7, 1980

[51] Int. Cl.$^3$ .............................................. C25F 1/00
[52] U.S. Cl. .................................................. 204/144
[58] Field of Search ................ 204/129.75, 144, 129.4

[56] References Cited

U.S. PATENT DOCUMENTS

| | | | |
|---|---|---|---|
| 1,971,761 | 8/1934 | Travers | 204/3 |
| 2,052,962 | 9/1936 | Booe | 204/144 |
| 2,336,846 | 12/1943 | Clark | 204/141 |
| 2,853,445 | 9/1958 | Catotti | 204/129.75 |
| 3,761,368 | 9/1973 | Ford et al. | 204/129.75 |
| 3,779,877 | 12/1973 | Alwitt | 204/129.75 |

FOREIGN PATENT DOCUMENTS 756039  8/1956  United Kingdom ............... 204/144

OTHER PUBLICATIONS

A.P.C. Application of G. G. Guterman, Ser. No. 387,252, Publ. May 18, 1943.

*Primary Examiner*—T. M. Tufariello
*Attorney, Agent, or Firm*—Connolly and Hutz

[57] ABSTRACT

Residual chlorides are removed from electrochemically etched aluminum foil by coupling the foil to an inert electrode having a low hydrogen overvoltage while contacting the foil with nitric acid.

4 Claims, No Drawings

POST-TREATMENT OF ETCHED ALUMINUM CAPACITOR FOIL

BACKGROUND OF THE INVENTION

This invention relates to the post-treatment of aluminum capacitor foil that has been electrochemically etched in a chloride-containing solution. More specifically, it relates to contacting the etched foil with nitric acid while the foil is galvanically coupled to an inert electrode having a low hydrogen overvoltage.

Nitric acid has been used in the prior art to open up the fine etch structure of aluminum and to remove some chlorides. However, residual chlorides have remained in the fine tubes or tunnels, particularly with highly etched foil for high voltage capacitor use. It is well-known that chloride contamination causes aluminum electrolytic capacitor failure.

SUMMARY OF THE INVENTION

It is a feature of this invention to remove residual chlorides from electrochemically etched aluminum foil, and particularly those residual chlorides entrapped in the fine etch structure of high-voltage capacitor foil.

The foregoing and related features of this invention are accomplished by contacting etched rinsed foil with nitric acid while the foil is connected to an electrode that is inert to nitric acid and which has a low hydrogen overvoltage so as to form a galvanic couple to improve the rate of pore opening and the removal of entrapped chlorides.

Among the desirable inert electrode materials for this invention are platinum, platinized materials, stainless steel, and graphite. Copper has been used in prior art processes, but unfortunately has the tendency to go into solution and plate out on the aluminum foil surface. Care must be taken with platinized materials to insure that the platinum coating is thick enough so that the underlying material is not exposed to attack by nitric acid. When using graphite, electrode selection should take into account the type of binder used to insure that it is not leached by the nitric acid.

DESCRIPTION OF THE PREFERRED EMBODIMENTS

In the following examples, data are presented for various nitric acid concentrations with the electrode coupled via a cable or bus bar and uncoupled (no connection other than the electrolyte). In some of the examples, aluminum nitrate was added to more closely simulate a commercial bath in which aluminum ion concentration would build-up. The initial chloride level on the etched foil before nitric acid post-treatment varied, but the worst foil to be treated analyzed 10 $\mu g/cm^2$ chloride. No chloride could be detected in foil treated in accordance with this invention. Weight loss measures not only chloride removal but also pore opening, which also aids in chloride removal.

EXAMPLE 1

In this example, high voltage foil was treated with various concentrations of nitric acid alone and when the foil was coupled with a platinized electrode.

TABLE 1

| Nitric acid concentration | Treating Time | Bath Temperature | Weight loss, % Not Coupled | Weight loss, % Coupled |
|---|---|---|---|---|
| 1.0M | 1.5 min | 90° C. | 4.26 | 6.97 |
| 1.0M | 3.0 min | 90° C. | 10.14 | 12.57 |
| 0.6M | 1.5 min | 99° C. | 5.3 | 7.2 |
| 2.0M | 1.5 min | 99° C. | 10.3 | 16.3 |
| 3.0M | 1.5 min | 99° C. | 13.0 | 17.9 |

EXAMPLE 2

In these runs, aluminum nitrate was added to the bath to simulate the bath conditions during continuous use. A platinum sheet electrode and one of 2.5$\mu$ Pt electroplated on titanium were used.

| Reaction time, sec | Bath Temperature | Aluminum ion conc. | Nitric Acid | Weight loss % Pt | Weight loss % Pt/Ti |
|---|---|---|---|---|---|
| 60 | 98° C. | 1.0M | 1.0M | 17.5 | 16.6 |
| 120 | 98° C. | 1.0M | 1.0M | 32.2 | 32.2 |
| 60 | 98° C. | 2.0M | 1.0M | 11.9 | 12.9 |
| 120 | 98° C. | 2.0M | 1.0M | 22.8 | 23.0 |
| 90 | 99° C. | 0.6M | 2.0M | 27.6 | — |

EXAMPLE 3

In this Example, the inert electrode coupled to the foil was a 302 stainless steel one. The solution was 1.0 M nitric acid containing 2.0 M aluminum ions. Typical results are shown below. The temperature of the bath was 98° C.

| Reaction Time, sec. | Weight loss, % |
|---|---|
| 30 | 3.8 |
| 60 | 7.5 |
| 90 | 11.4 |
| 120 | 15.2 |

EXAMPLE 4

In this Example, results using a graphite electrode are compared with those using platinum and platinum on titanium electrodes. The solution was 1.0 M nitric acid containing 2.0 M aluminum ions. The temperature of the bath was 98° C., and reaction time was 2.0 min.

| Electrode | Weight loss, % |
|---|---|
| Pt | 22.8 |
| Pt/Ti | 23.0 |
| graphite | 24.0 |

EXAMPLE 5

Because the nitric acid bath developed a yellow color during use with the graphite electrode in the previous example, a different graphite electrode that did not contain a resin binder was evaluated at the same conditions as were used in Example 4 except that the same solution was used throughout with make-up nitric acid being added. A total of 16 foil samples were treated. Results are presented below and compared with those using a platinum electrode.

| Foil samples | Weight loss, % |
| --- | --- |
| #1, #2 | 24.5 |
| #15, #16 | 19.5 |
| Pt electrode | 22.8 |

Foil samples treated by the process of the present invention were subjected to electron probe microanalysis and no chloride could be detected. A total of 10 points on both sides of the foil were measured. Untreated foil samples varied in chloride concentration with the worst, or "dirty foil", averaging 10 μg/cm² chloride.

What is claimed is:

1. A process for removing residual chlorides from electrochemically etched aluminum foil comprising coupling the foil by spaced coupling means to an electrode inert to nitric acid and having a low hydrogen overvoltage while contacting the foil with nitric acid, said electrode being cathodic to said aluminum foil.

2. A process according to claim 1 wherein said inert electrode is a graphite or a platinum electrode.

3. A process according to claim 1 wherein the concentration of said nitric acid is 0.6 to 3.0 M.

4. A process according to claim 1 wherein said electrode is graphite and said nitric acid concentration is 1.0 M.

* * * * *